United States Patent [19]

Furlette et al.

[11] 4,042,104
[45] Aug. 16, 1977

[54] CONVEYOR

[76] Inventors: James L. Furlette, 984 Bal Isle, Fort Myers, Fla. 33902; Donald Stadler, 10400 Hartland Road, Fenton, Mich. 48430

[21] Appl. No.: 617,411

[22] Filed: Sept. 29, 1975

[51] Int. Cl.² ............................................. B65G 25/02
[52] U.S. Cl. ..................................... 198/774; 198/859
[58] Field of Search ............... 198/218, 219, 485, 774, 198/775, 776, 859

[56] References Cited

U.S. PATENT DOCUMENTS

| | | | |
|---|---|---|---|
| 1,755,875 | 4/1930 | Holiday et al. | 198/774 |
| 2,481,440 | 9/1949 | Page | 198/219 X |
| 2,538,914 | 1/1951 | Rosenthal | 198/219 X |
| 2,857,035 | 10/1958 | Gagnon | 198/218 X |
| 2,857,043 | 10/1958 | Eden | 198/204 |
| 3,194,380 | 7/1965 | Watson | 198/485 |
| 3,313,400 | 4/1967 | Johnson | 198/204 X |
| 3,478,862 | 11/1969 | Niederer | 198/219 X |

FOREIGN PATENT DOCUMENTS

1,355,796  6/1974  United Kingdom ............... 198/218

*Primary Examiner* — John J. Love
*Assistant Examiner* — Richard K. Thomson
*Attorney, Agent, or Firm* — Gifford, Chandler, Sheridan & Sprinkle

[57] ABSTRACT

A work piece conveyor particularly suitable for moving piston connecting rods. The conveyor comprises at least two stands secured to base in a spaced apart relationship from each other. A pair of spaced and parallel rail members are secured to and between the stands in a generally horizontal elevation. A rough assembly having an elongated base portion is positioned beneath and parallel to the rail members so that the base of the trough assembly is spaced apart from the rail members at a predetermined distance. An oscillating mechanism is utilized to vertically oscillate the trough assembly relative to the rail members.

The piston connecting rods are placed on the conveyor so that the ring portion of the piston rod connector is supported by the rail members and the elongated rod portion of the piston rod connector depends downwardly and abuts against the rough assembly base portion. As the trough assembly moves vertically upward toward the rail members, the ring portion of each connecting rod slides longitudinally along the rail members due to the shape and weight distribution of the piston rods. Conversely as the trough assembly moves vertically downward away from rail members, the connecting rod portion of the piston rod swings within the trough assembly thus providing longitudinal movement of each connecting rod along the trough assembly.

5 Claims, 6 Drawing Figures

4,042,104

CONVEYOR

BACKGROUND OF THE INVENTION

1. Field of the Invention

The present invention relates generally to conveyor apparatus and in particular to a conveyor particularly adapted to transport piston connecting rods.

2. Description of the Prior Art

There are many previously known conveyors for moving work pieces between two or more spaced apart stations. In addition many of these previously known conveyors utilize a vibratory action to move the work pieces from station to station. However, none of the previously known work piece conveyors have utilized the shape and weight distribution of the work piece in combination with vibratory motion to move the work pieces along the conveyor. The previously known vibratory conveyor systems also lack versatility in that the conveyor system is operable to transport the work pieces in only one longitudinal direction.

SUMMARY OF THE PRESENT INVENTION

The conveyor system of the present invention overcomes the above mentioned disadvantages of the previously known vibratory conveyor systems, by providing a vibratory conveyor system which utilizes the vibratory motion of the conveyor in combination with the shape and weight distribution of the work pieces to propel the work pieces longitudinally from station to station along the conveyor. The conveyor of the present invention also enjoys additonal versatility in that by changing the position of the work pieces on the conveyor, the longitudinal direction of travel for the work pieces may be changed. The conveyor of the present invention achieves the above mentioned advantages by providing at least two spaced apart stands secured to a base and having a pair of spaced and parallel rail members horizontally secured between the support stands. A trough assembly having an elongated base portion is positioned beneath the rail members so that the base portion is generally parallel to the rail members and spaced apart from the rail members at a predetermined distance. An oscillating mechanism is secured between the stands and the trough assembly and functions to vertically oscillate the trough assembly relative to the rail members.

The work pieces have an upper portion adapted to be supported by the rail members and also a downwardly extending lower portion which is received within the trough assembly. The longitudinal length of the work piece lower portion is greater than the predetermined distance between the rail members and the trough assembly base portion so that the lower end of the work piece lower portion abuts against the trough assembly base portion.

As the trough assembly oscllates towards the rail members, the trough assembly lifts the work piece up off the rail members so that the work piece upper portion tips in a predetermined longitudinal direction due to the shape and weight distribution of the work piece thus longitudinally moving the work piece upper portion along the rail members. Conversely as the trough assembly moves downwardly from the rail members, the work piece lower portion swings within the trough assembly, again to the work piece shape and weight distribution, thus causing the work piece lower portion to move longitudinally along the trough assembly.

BRIEF DESCRIPTION OF THE DRAWINGS

The conveyor assembly of the present invention will be more clearly understood by reference to the following detailed description when read in conjunction with the accompanying drawing wherein like reference characters refer to like parts throughout the several views and in which.

DETAILED DESCRIPTION OF THE PRESENT INVENTION

Figure 1:
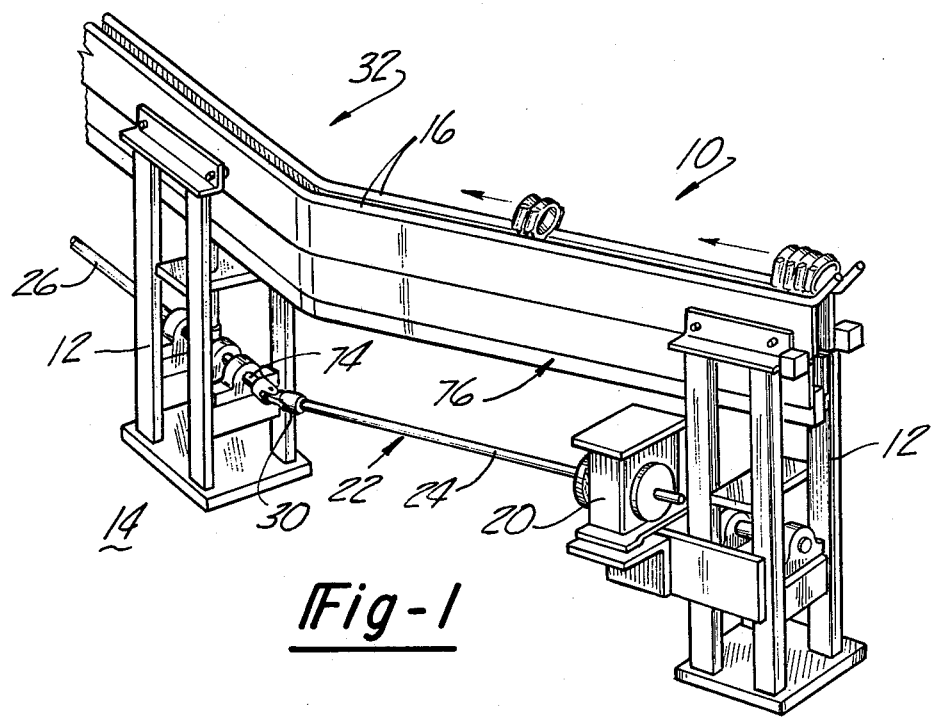
FIG. 1 is a perspective view showing the conveyor of the present invention.

Referring to FIG. 1 the conveyor 10 of the present invention comprises a plurality of support stands 12 secured to a base 14, such as a floor, so that the support stands 12 are positioned in a spaced apart relationship relative to each other. In a manner to become hereinafter apparent, a pair of spaced and parallel rail members 16 are secured between the support stands 12 in a generally elevated and horizontal position. Similarly, a trough assembly 76 is carried by the support stands 12 and is positioned generally parallel to and beneath the rail members 16. A motor 20 is secured to one of the support stands 12 and rotatably powers a shaft assembly 22. In the illustration shown in FIG. 1, the shaft assembly 22 comprises a pair of shaft segments 24 and 26 coupled by universal joints 30 and shafts 74 so that the conveyor 10 may include articulated corners 32.

Each of the support stands 12 is substantially identical to the other so that only a single support stand 12, best shown in FIGS. 2 and 3, will be described in detail. The support stand 12 includes four vertical support legs 34 in a spaced apart relationship to each other and secured to each other by a base plate 36 and a central cross plate 38. Any conventional means, such as weld 40, may be utilized to secure the support members 34 to the base plate 36 and cross plate 38 and likewise bolts or the like may be utlized to secure the base plate 36 to the base 14. The horizontal legs 43 of a pair of right angle flanges 42 are fastened by welds 44 across the upper surface 46 of the support legs 34 so that the vertical legs 48 of the flanges 42 are facing and in a spaced and parallel relationship to each other.

Figures 2, 3:
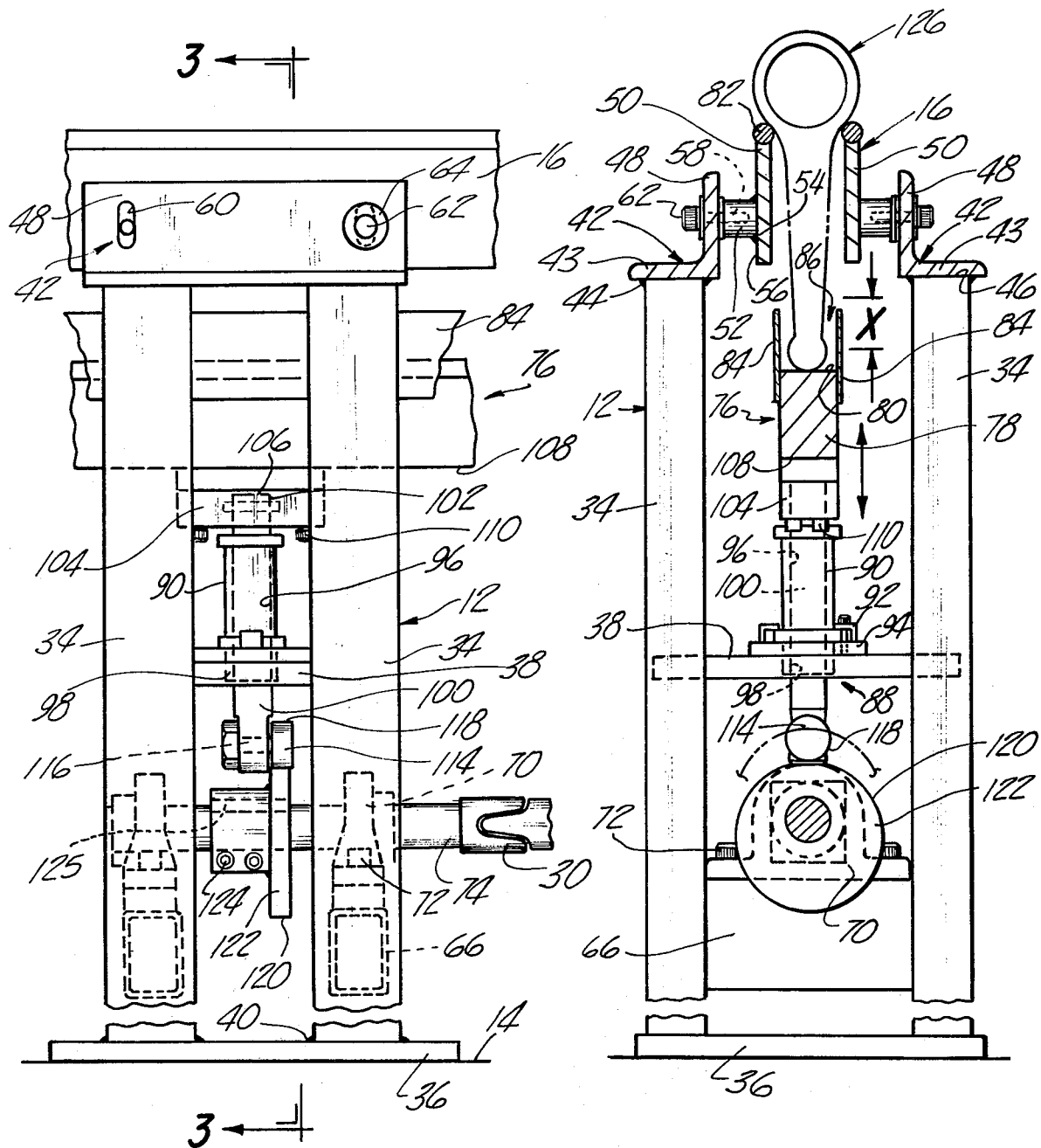
FIG. 2 is a side plan view showng one of the support stands of the conveyor of the present invention.
FIG. 3 is a partial cross-sectional view taken substantially along 3—3 in FIG. 2.

The rail members 16, shown in more detail in FIGS. 2 and 3, comprise a pair of elongated spaced and parallel vertical plate members 50 positioned parallel to and between the vertical legs 48 of the right angle flanges 42. At least one horizontal cylindrical boss 52 is secured by weld 54 to the outer surface 56 of each plate 50 and includes a threaded aperture 58 which registers with a slot 60 formed in the vertical leg 48 of the respective right angle flange 42. A bolt 62 with a washer 64 is inserted through each slot 60 and threadably engages the aperture 58 of the cylindrical boss 52 to secure each rail member 16 to its respective right angle flange 42 and hence to the support stand 12. It should be apparent that the vertical elevation of the rail members 16 may be adjusted within the limits of the slot 60 by changing the position of the bolt 62 in the vertical slot 60.

A pair of tubular cross members 66 are secured by welds transversely between support legs 34 and a bearing support member 70 is secured to each of the cross members 66 by Allen head bolts 72 or the like. Each bearing support 70 includes registering apertures with bearing means adapted to rotatably receive the shaft 74 therethrough. The universal joint 30 is secured to each end of the shaft 74 and is adapted for securement to one of the shaft segments 24 or 26 so that the shaft 74 forms a part of the shaft assembly 22. Thus rotation of the shaft assembly 22 by the motor 20 effects a corresponding rotation of the shaft 74 secured to each of the stands 12.

The elongated trough assembly 76 passes between the support legs 34 of the stand directly vertically beneath and parallel to the rail members 16. The trough assembly 76 includes an elongated base member 78 having an upper surface 80 which is parallel to the upper surface 82 of the rail members 16 and spaced apart from the rail member upper surface 82 by a predetermined distance. A vertical panel member 84 is secured to each side of the base member 78 thus forming a U-shaped channel 86 bounded by the side panels 84 and the base member upper surface 80.

The trough assembly 76 is not secured to the stand 12, but rather oscillating means 88 are included to vertically oscillate the trough assembly 76 relative to the rail members 16. The oscillating means 88 comprises a vertical tubular cylinder 90 secured to the cross member 38 by any conventional means, such as clamps 92 and a mounting plate 94. The cylinder bore 96 registers with a bore 98 formed through the cross member 38. A piston 100 is slidably received through registering bores 96 and 98 and is secured at its upper end 102 to a mounting plate 104 by any conventional means such as a pin 106. The mounting plate 104 is in turn secured to the lower surface 108 of the trough assembly base member 78 by screws 110 or the like.

A roller 114 is rotatably secured to a transverse axle 116 at the lower end 112 of the piston 100. The bearing surface 118 of the roller 114 is positioned to engage the bearing surface 120 of a wheel 122 having an offset center of rotation, hereinafter called the offset wheel 122 for brevity. The offset wheel 122 is secured against rotation to the shaft 74 by any conventional means such as bolts 124 and a key 125. In addition, the rotation position of the offset wheel 122 is identical for each stand 12.

In operation, as the motor 20 rotates the shaft assembly 22, the shaft 74 for each stand 12 is rotated in unison by the shaft segments 24 and 26 in combination with the universal joints 30. The offset wheel 122 rotates with the shaft 74 so that the radial distance beween the axis of the shaft 74 and the bearing surface 120 varies at the point of contact with the roller bearing surface 118 in accordance with the rotational position of the offset wheel 122. Thus, as the offset wheel 122 rotates, the roller 114 with the attached piston 100 vertically oscillates at a rate of one oscillation per revolution of the shaft 74. The trough assembly 76, secured to the upper end 102 of the piston 100 likewise vertically oscillates in relation to the rail members 16. Since the rotational position of the offset wheel 122 is identical for each stand 12, the trough assembly 76 remains horizontal throughout its vertical movement.

Figures 4, 5, 6:
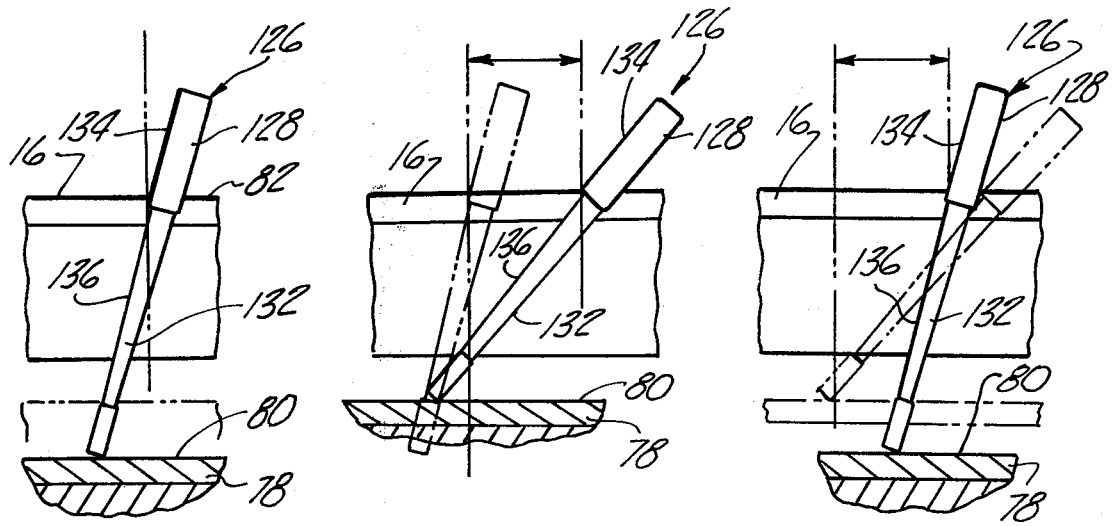
FIGS. 4–6 are diagrammatic representations of the operation of the conveyor of the present invention in combination with a piston connecting rod.

The operation of the trough assembly 76 oscillation in relation to the rail member 16 to produce longitudinal movement along the rail members 16 as best described by reference to FIGS. 4–6. In FIGS. 4–6 a work piece 126, shown to be a piston rod connector, is illustrated as having its ring portion 128 supported by the rail members 16 and its rod piston 132 depending downwardly and abutting the upper surface 80 of the trough assembly elongated base member 78. The work piece 126, however, may take other forms provided that the work piece 126 includes an upper portion 134 adapted to be supported upon the rail members 16 and a downwardly depending portion 136 having a longitudinal length greater than the predetermined distance between the upper surface 82 of the rail members 16 and the upper surface 80 of the elongated base member 78 so that the work piece 126 tilts slightly rightward as shown in FIG. 4.

Assuming that FIG. 4 illustrates the trough assembly 76 in its lower most position, and referring to FIG. 5, as the offset wheel 122 rotates one-half of a revolution, the trough assembly 76 vertically rises in the previously described manner from the position shown in phantom lines to the position shown in solid lines. In doing so due to the shape and weight distribution of the work piece 126, the work piece 126 tilts slightly to the right and slides along the rail members 16 thus causing a rightward longitudinal movement of the work piece upper portion 134 along the rail members 16. Now referring to FIG. 6, as the offset wheel 122 rotates one-half of a revolution from the position shown in FIG. 5, the trough assembly 76 is lowered to the position originally shown in FIG. 4, so that due to the shape and weight distribution of the work piece, 126, the work piece lower portion 136 swings on the rail members 16 in a generally counter-clockwise direction from the position shown in phantom lines to a position shown in solid lines thus effecting a rightward longitudinal movement of the work piece lower portion 136 along the trough assembly 76. It should be apparent that the cycle illustrated in FIGS. 4–6 is continuously repeated with each rotation of the offset wheel 122 thereby causing a continuous travel of the work pieces 126 along the conveyor 10. It should also be apparent that the trough assembly side panels 34 prevent the work piece lower portion 136 from sliding off the top surface 80 of the base member 78.

For the operation of the conveyor 10 of the present invention, it is necessary that the lower depending portions 136 abut against the upper surface 80 of the trough assembly base member 78. In order to accomodate work pieces having lower depending portions 136 with different longitudinal lengths, the distance between the upper surface 82 of the rail members 16 and the upper surface 80 of the trough assembly base portion 78 may be varied by adjusting the elevation of the rail members 16 within the limits of the slot 60 on the flange members 42. Likewise it should be apparent that since the trough assembly 76 oscillates only vertically with respect to the rail members 16, the direction of travel of the work pieces 126 along the rail members 16 may be reversed by merely tilting the work pieces 126 in the opposite longitudinal direction.

The conveyor of the present invention in combination with a piston rod connector or similarly shaped work piece 126 thus provides a unique conveyor system of relative simple and inexpensive construction. The conveyor of the present invention also enjoys versatility unknown to previous known conveyor systems in that the direction of travel of the work pieces along the conveyor is solely dependent upon the work piece position on the conveyor thereby eliminating the previously known expensive and complex conveyor reversal mechanisms.

Many modifications to the conveyor of the present invention will be apparent to those skilled in the art to which it pertains without deviating from the spirit of the invention as defined by the scope of the appended claims.

What is claimed is:

1. In combination:

a conveyor comprising at least three stands each secured to a base and in spaced apart relationship, said conveyor further comprising a pair of spaced and parallel rail members mounted to and between said stands in a generally horizontal position so that said rail members are supported only by said stands and wherein said rail members include at least one angled section, a trough assembly having an elongated base portion, said base portion being positioned beneath and parallel to said rail members and spaced apart from said rail members at a predetermined distance, at least one workpiece, said workpiece having an upper portion supported by said rail members and a downwardly depending lower portion received in said trough assembly, said lower portion having a longitudinal length greater than said predetermined distance between said rail members and the base portion of said trough assembly so that the lower end of the workpiece lower portion abuts against the trough assembly base portion, and means to vertically oscillate said trough assembly and said rail members relative to each other to thereby move said workpiece along said conveyor, said means comprising a generally horizontal shaft and bearing support means secured to each of said stands for rotatably receiving said shaft, a generally horizontal drive rod disposed between each pair of stands and underneath said rail members, each of said drive rods being connected by universal joint means to said shafts whereby rotation of one drive rod simultaneously rotatably drives all of said shafts and said drive rods, means for rotating one of said drive rods, and means disposed in each of said stands for simultaneously and in unison translating the rotary motion of said shafts into vertical, oscillating motion of said trough assembly and said rails relative to each other.

2. The combination defined in claim 1 and including means to vary the distance between said trough assembly base portion and said rail member.

3. The combination as defined in claim 1 wherein said work piece is a piston connecting rod.

4. The combination as defined in claim 1 wherein said trough assembly further comprises a pair of spaced apart and parallel upwardly extending side panels, one of said side panels being secured along each side of said trough assembly base portion.

5. The combinaton as defined in claim 1 and in which said last mentioned means further comprises:

at least two cylinders each having an axial bore, one cylinder being secured to each of said stands, each of said cylinders having a piston slidably disposed in its bore, said pistons each having their upper end secured to said trough assembly and a roller secured to the lower end of each of said pistons, and a pair of cam members of substantially identical configuration, each of said cam members being fixed to said shaft with each engaging one of said rollers to thereby impart the same vertical oscillatory motion to said pistons and thus to said trough assembly at spaced points along said conveyor.

* * * * *

UNITED STATES PATENT AND TRADEMARK OFFICE
CERTIFICATE OF CORRECTION

PATENT NO. : 4,042,104
DATED      : August 16, 1977
INVENTOR(S) : James L. Furlette It is certified that error appears in the above-identified patent and that said Letters Patent are hereby corrected as shown below:

Abstract, line 6, delete "rough", insert --trough--;

line 17, delete "rough", insert --trough--.

Col. 1, line 32, delete "additonal", insert --additional--;

Col. 1, line 66, after "again", insert --due--.

Col. 3, line 68, delete "as", insert --is--.
(our error)

Col. 4, line 4, delete "piston", insert --portion--.

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*